July 22, 1952
R. SKAGERBERG
2,604,268
HEATING SYSTEM FOR BUILDINGS
Filed Dec. 1, 1948
2 SHEETS—SHEET 1
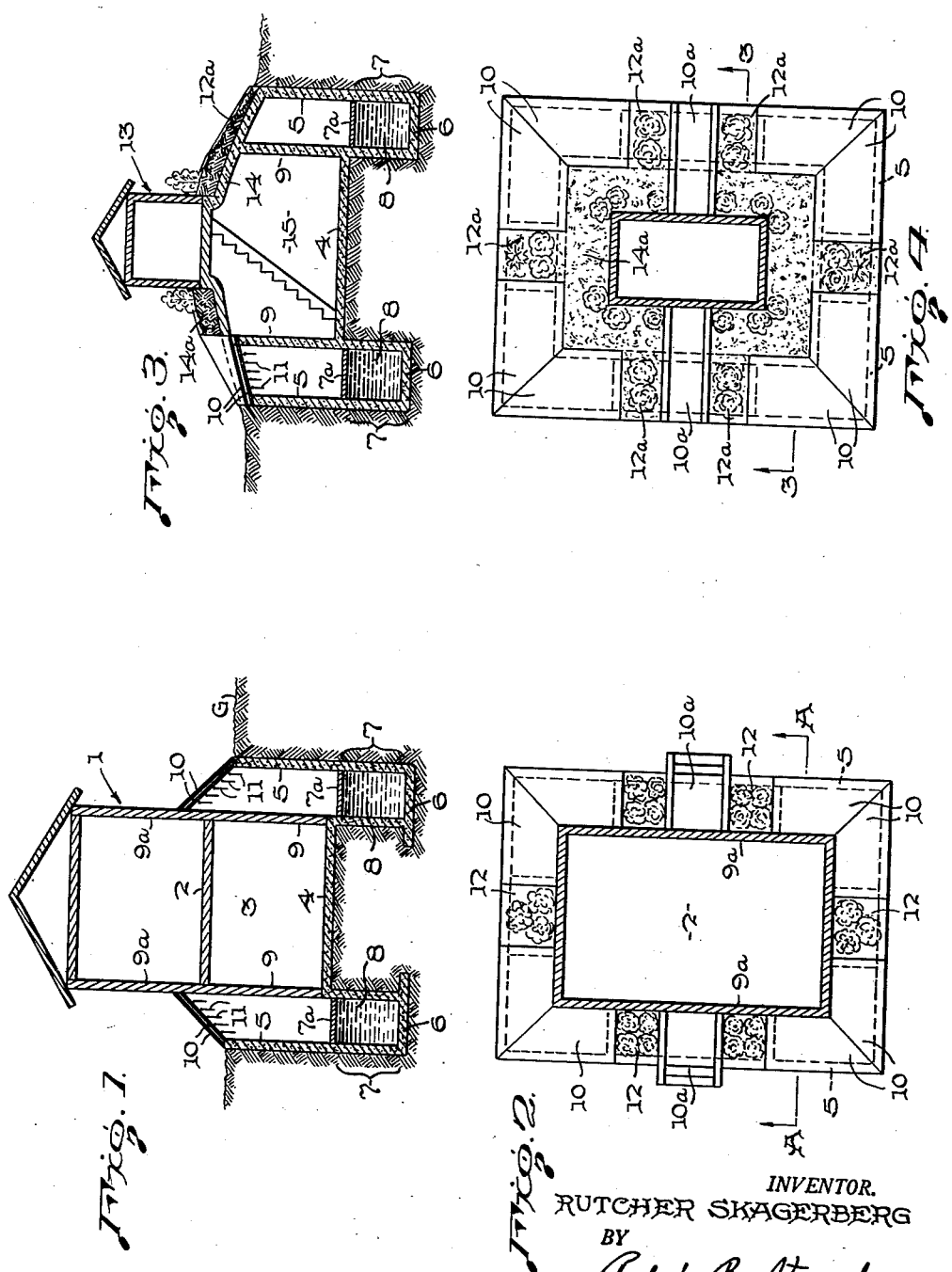
INVENTOR.
RUTCHER SKAGERBERG
BY
Ralph B. Stewart
ATTORNEY July 22, 1952 R. SKAGERBERG 2,604,268
HEATING SYSTEM FOR BUILDINGS
Filed Dec. 1, 1948 2 SHEETS—SHEET 2
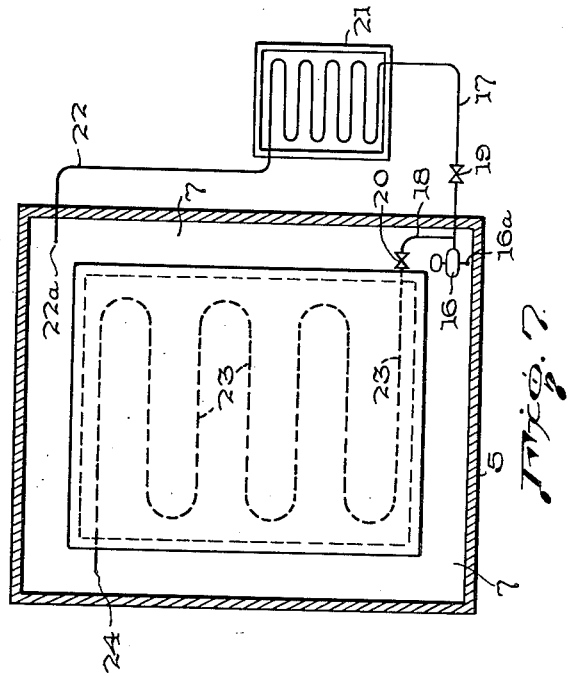
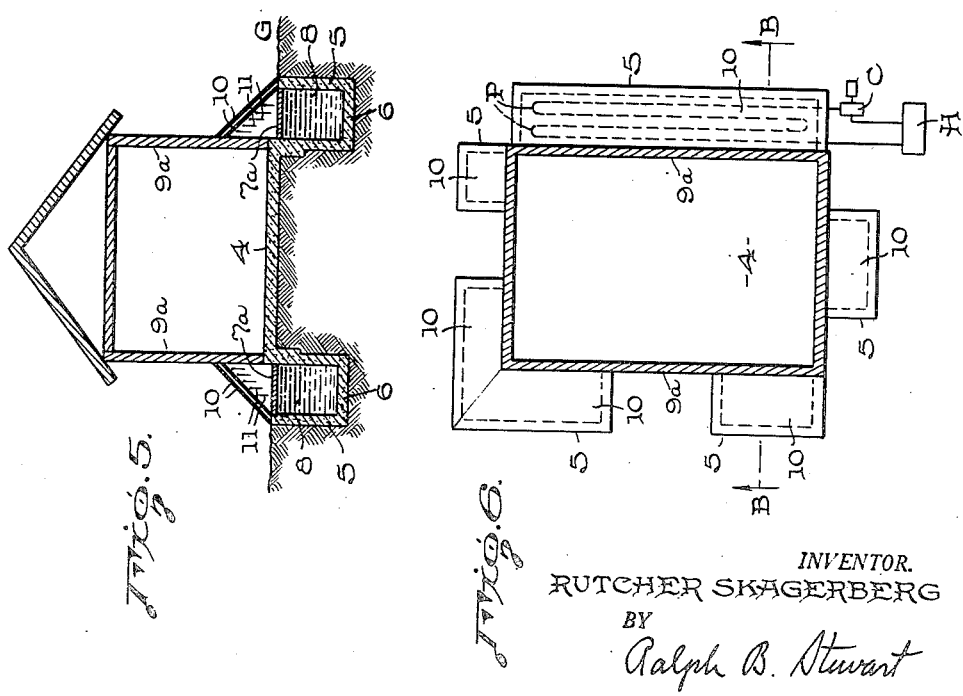
INVENTOR.
RUTCHER SKAGERBERG
BY
Ralph B. Stewart
ATTORNEY Patented July 22, 1952

2,604,268

UNITED STATES PATENT OFFICE 2,604,268

HEATING SYSTEM FOR BUILDINGS

Rutcher Skagerberg, Alexandria, Va.

Application December 1, 1948, Serial No. 62,861

7 Claims. (Cl. 237—1)

This invention relates to a heating system for buildings and especially for buildings having underground structures.

An object of my invention is to provide a system for heating buildings at an extremely low cost by using readily available sources of energy which are ordinarily wasted.

Another object is to devise a heating system in which the ground under and around the building is used for heat storage.

A more specific object is to devise a heating system in which heat is transferred to the building through the outer edges of a floor slab of the building resting on the ground, and also through the lower outer walls of the building.

A further object is to devise a heating system especially adapted to utilize solar energy as a source of heat.

It is a further object of my invention to provide an underground structure which will be free from the disadvantages typical of such structures, and which at the same time is cheap to construct and to maintain.

Up to the present time very little use has been made of underground structures other than for storage purposes. Basements under dwellings and the like are commonly regarded as unhealthy and otherwise unfit for human habitation. The most serious disadvantage of such structures is that they are invariably cold and damp both in the winter and summer months. The temperature of the subsoil is substantially below 70° F., which is the comfortable indoor temperature. Thus, the walls and floors, usually made of stone or concrete, are constantly cooled by contact with the cold subsoil and serve as excellent condensation surfaces for the moisture present in the warmer air enclosed by the walls. These conditions also prevail in buildings without basements where the lower floor is a slab resting on top of the ground.

Many expedients have been employed to obviate this difficulty, such as the use of insulation material to thermally insulate the walls from the cold subsoil, or the installation of heating coils in the walls and floor to counteract the cooling effect of the outer subsoil. These methods, however, are all costly and have not overcome the objections to underground structures for dwelling purposes.

I have now discovered that these disadvantages can be entirely overcome by installing an underground heat reservoir in the form of a moat extending around all or a substantial portion of the periphery of the lowermost floor of the building to be heated. This lowermost floor is usually of a slab construction and rests directly upon the soil or the subsoil as the case may be. A heat transfer medium, either liquid or gaseous, is disposed in the reservoir in heat transfer relationship with the periphery of the floor and with the periphery of the walls at the point they are joined to the floor. The medium or fluid in the reservoir is supplied with heat from sources which ordinarily would remain unutilized, such as the heat energy of the sun, and this heat is stored so that it may be given up to the walls and floor of the building.

While my invention is particularly useful in connection with buildings having a major portion of their structure below the surface of the ground, as will be explained below, the principle of using a heat storage reservoir or sump below the surface of the ground and in heat transfer relationship with the periphery of the floor and side walls of the building can be applied to a building having a floor slab resting directly on the surface of the ground.

A floor resting on earth loses heat to the earth if the latter is lower in temperature than the floor. I propose to stop this by warming the soil under the floor and the outer wall of the building at its juncture with the floor so that those surfaces will tend to transmit heat to the interior atmosphere rather than abstracting heat therefrom.

The most critical areas of heat loss from the floor are at its edges which are in contact with earth that is often wet or frozen, freezing and thawing, and otherwise demanding of heat from the floor. This heat loss is prevented by installing underground warm water reservoirs along the outer edges of the floor, thus preventing frosting and collecting of ice and snow.

Heat loss is further prevented by covering the moat along the outside of the floor by a cover that will serve as an insulator to prevent heat loss from the moat to the atmosphere in that area. It will also reduce the heat loss effects of rain and snow falling on that area. By extending this cover up against the wall for two or three feet the heat collecting under the cover will be forced to enter the wall.

The condition along the edges of the floor where the walls join it will be improved by heating both floor and wall; this improves comfort, stops drafts and prevents mildew.

An added feature is that all or part of the above cover is of glass, preferably double-pane glass or other translucent material which will admit solar energy and thereby heat the air within the moat and also heat the inner wall area of the moat upon which sunlight strikes. This cover is arranged to be removed or opened in summertime for ventilation or decorative purposes. It can serve in winter or early spring as a greenhouse for germinating seeds and rooting plants.

To further heat the walls which are below the surface of the ground and to furnish additional heat for storage, the reservoir may be constructed as a moat surrounding a substantial portion of the building and will be provided with a cover as described above.

In order to illustrate the invention clearly and to give several specific embodiments thereof, reference is made to the drawings. It is to be understood, however, that these embodiments are merely illustrative and are not intended to limit the scope of the invention.

Figure 1 is a diagrammatic sectional view of a building of the basement type heated in accordance with my invention.

Figure 2 is a plan view of the building shown in Figure 1 with the roof removed and in which the line A—A indicates the cutting plane for Figure 1.

Figure 3 is a sectional view of an underground building heated in accordance with my invention.

Figure 4 is a plan view of the building shown in Figure 3, showing the cutting plane 3—3 for Figure 3.

Figure 5 is a diagrammatic sectional view of a conventional building without a basement heated in accordance with the principle of my invention, the section being taken along the line B—B of Figure 6 which is a plan view of the building shown in Figure 5 with the room removed.

Figure 7 is a diagrammatic cross-sectional view showing an arrangement for supplying heat to the underground reservoir.

Referring now more particularly to Figures 1 and 2, the numeral 1 designates a building having a ground-level floor 2 and a basement 3 below the surface G of the ground. The floor of the basement is a slab 4 of concrete or the like and rests directly in contact with the soil on which it is laid. A moat having an outer wall 5 and a bottom wall 6 is constructed about the periphery of the building and extends from ground level to a level below the basement floor as shown in Figure 1. As shown in Figure 1, the inner wall of the moat may form the footing of the building and supports the peripheral portion of the floor slab 4. Preferably, the floor slab is poured integrally with the inner wall of the moat. The lower portion of the moat as shown at 7 is filled with a fluid heat transmitting medium 8, such as water, and forms a reservoir for the storage and transfer of heat, the liquid in the reservoir extending up to a level just below the floor slab 4. The heat transmitting medium may be gaseous such as air or steam but preferably is a liquid, such as water, and the reservoir may be provided with a cover 7a. The reservoir 7 is arranged in heat transfer relationship with the periphery of the floor slab 4 and the bottom periphery of the basement walls 9. The moat is provided with a cover 10 preferably constructed of a material such as double pane glass which will thermally insulate the moat from the atmosphere while admitting the radiant energy of the sun. From Figure 1 it will be noted that the cover 10 is supported in an inclined position between the wall 5 of the moat at ground level and against the walls of the building so that the heat from the air space in the moat serves to heat a portion of the first-floor walls 9a above the ground level. Shutters 11 are associated with the covers 10 to control the amount of radiation entering the moat. Walkways and steps 10a to the building are placed across the moat at suitable points.

The reservoir 7 may be continuous, extending around the entire periphery of the house or several reservoirs may be disposed at intervals around the periphery. While it is essential for the efficient operation of my heating system that the reservoirs be located mainly about the periphery of the lower floor which rests directly in contact with the soil, it is sometimes desirable that the reservoir extend for a relatively short distance beneath the floor. The moat 5 need not be continuous but may be interrupted at various points 12 for the installation of shrubberies or for other purposes. On the other hand, the moat and reservoir may be continuous but covered over with soil at various places for like reasons.

Figures 3 and 4 illustrate the invention applied to a building structure the major portion of which is located below the surface of the ground. Such a structure would be especially valuable in time of war when adequate protection from aerial bombardment is essential. The structure shown in these figures is essentially the same as that shown in Figures 1 and 2 except that here the portion of the building above the ground is small in comparison with the underground structure. A small penthouse 13 is erected on the top wall 14 of the main living space 15 located mainly below ground level. The greater part of the top surface of the underground structure is covered over with earth 14a which at the same time insulates the underground space 15 from the atmosphere and camouflages it from view. In Figures 3 and 4, the moat and reservoir entirely surround the house and is bridged over at places marked 12a for the planting of shrubs or flowers.

Figures 5 and 6 illustrate the application of the principle of the invention to a building constructed entirely above the ground and laid upon a slab foundation which in turn rests directly in contact with surface soil. It is very desirable to supply this type of slab foundation with heat particularly at the edges thereof since it is at this point that freezing and cracking of the slab most often occur due to the fact that heat is conducted away from the edges of the slab faster than from the interior portions. The construction shown in Figures 5 and 6 is believed to be obvious since the same reference numerals are employed to indicate the same structures employed in Figures 1 and 2. In this arrangement the moat is substantially filled with heat transmitting or storing liquid, and there is no air space above the moat except that enclosed under the cover 10. The reservoir cover 7a in Figures 1, 3 and 5 may be covered over with a layer of soil or other insulating material to prevent the loss of heat from the reservoir during the winter and for greater comfort during the summer.

Figure 7 illustrates in a diagrammatic fashion the manner in which heat may be supplied to the fluid in the reservoir 7. Pump 16 takes in fluid from the reservoir at 16a and forces it through lines 17 and 18, controlled by valves 19 and 20 respectively. When valve 19 is open, the fluid will flow into the heat exchanger 21 and thence pass back into the reservoir through line 22 to a point 22a located remote from the intake 16a. When valve 20 is open, fluid will flow into coil 23 buried in or under the floor 4 and pass back into the reservoir at the point 24. The heat exchanger 21 may be of any desired type such as a hot water heater, but is preferably designed to collect solar energy to heat the fluid 8 passing there-through and may be located on top of the building. It is to be understood that an arrangement similar to that shown in Figure 7 is associated with the structures illustrated in Figures 1 to 6 for supplying the fluid contained in reservoir 7 with heat. Although the heat exchanger 21 will most usually derive its heat energy from the sun since this source is universally available, other sources of heat such as hot waste water or steam from the household or industrial plants may be used, or the exchanger may be an ordinary house heating furnace. The coil 23 buried under the floor slab 4 is not essential but it helps to distribute the heat over surface of the floor. The medium in the reservoir may be heated without circulation of the medium by installing heating pipes in the reservoir and circulating a heated medium through the pipes. This is shown in Figure 6 where heating pipes P are installed in the reservoir and are supplied with heated medium (such as steam or hot water) from heater H through a circulator C.

In the operation of the system, the reservoir or reservoirs surrounding the periphery of the lower floor of the building act as heat transfer units. Heat absorbed at the surface of the ground through the system illustrated in Figure 7 is carried down into the reservoirs and there utilized to heat the floors and walls of the building and the surrounding soil. The soil surrounding the underground building plays an important part in the successful operation of my system. It is well known that the soil conducts heat very poorly, a truth which is evidenced by the fact that even in the hottest summer months the temperature of the subsoil at a few feet below the surface of the ground rises but a very few degrees. This poor conductivity of the soil is a positive advantage in the operation of my system since the heat conducted to the soil by the reservoirs is stored in the vicinity of the building instead of being conducted away and dissipated. Thus the earth surrounding the building becomes a huge heating pad which has slowly soaked up the energy given off by the fluid in the reservoirs and slowly liberates this energy to keep the walls and floor of the underground building at an even comfortable temperature.

The arrangement of the reservoirs adjacent the periphery and for the most part below the level of the lowermost floor of the building which rests in direct contact with the soil is an important feature of the invention. This is the most desirable and efficient arrangement of the reservoirs for a number of reasons. First of all, the reservoirs are easier to construct and maintain when located at the periphery rather than beneath the floor. Secondly, in case water is the medium in the reservoir, the water need come into contact with only a small area of the floor and walls of the building and thus the need for extensive waterproofing is eliminated. Thirdly, by locating the reservoirs for the most part below the level of the floor, the reservoir can be sunk to a greater depth. This would tend to preserve more heat by creating a larger heat reservoir consisting of a deeper layer of soil under the floor. Fourthly, when the reservoir is located under the space (referred to as the moat) surrounding an underground structure, as illustrated in Figure 1, there is achieved several beneficial results: (a) the soil under the floor is heated and the warm water in the reservoir serves as a barrier to reduce heat loss from that mat of soil; (b) the outer wall of the underground house is warmed by conduction of heat from the reservoir which minimizes the heat loss from the interior of the house; (c) the outer walls of the moat also receive heat from the reservoir and tend to stay warm, which reduces the loss of heat from the outer surfaces of the house walls by radiation to the moat wall; (d) the cover of the reservoir (the floor of the moat) is warm and therefore supplies heat to the atmosphere in the moat; (e) the glass cover over the moat permits additional solar energy to enter the moat; (f) the combination of these effects condition the exterior of the underground structure so as to greatly minimize heat loss from the interior; (g) this not only makes for comfort at considerable saving in fuel but promotes uniformity of dwelling conditions and keeps the inner surfaces of the house warm enough at all times to preclude condensation and dampness; (h) the moat outside the house becomes a useable space for such purposes as raising flowers and vegetables, laundry room and laundry drying facilities, storing equipment, play space for children, etc. Finally, among the most critical points of heat loss of a building are the edges of the floor that rests on the ground. The soil outside is usually wet and cold and abstracts heat rapidly from the floor slab as well as from the vertical wall that rests on or communicates with the floor slab. This results in chilling the inner surfaces of the outer walls and the floor at their line of junction. This causes dampness, condensation, mildew and discomfort. These are all corrected by my system.

It is apparent from the foregoing description that the arrangement I have disclosed will provide greater comfort at less expense by my novel method of heating the floor and walls of a building and will make possible greater utilization of underground structures by rendering them more comfortable and healthful as places of human habitation as well as more suitable for places of storage particularly of materials affected by dampness.

I claim:

1. In a heating system for a building having its lowermost floor constructed as a heat-conducting slab resting directly in contact with the soil, a moat extending around a substantial portion of the periphery of said building adjacent the side walls thereof and extending below the level of said floor, said moat having an inner wall formed of heat conducting material arranged in contact with the peripheral portion of said slab, a cover for said moat adapted to thermally insulate said moat from the atmosphere while admitting the radiant energy of the sun, and a fluid heat-transfer medium contained in the moat below the level of said floor and forming a heat reservoir for supplying heat to said slab through the inner wall of said moat and through the soil beneath said slab.

2. A heating system according to claim 1 wherein said cover for said moat is supported in an inclined position against the walls of said building above the ground, whereby heat from said reservoir heats a portion of the said walls above ground level.

3. In a system for heating a building in which the walls of said building are formed of heat-conducting material and are supported upon a footing wall which extends below the surface of the ground, the combination of a moat formed around a substantial portion of the periphery of said building, a cover for said moat arranged above the ground in an inclined position against the walls of said building and adapted to thermally insulate said moat from the atmosphere while admitting the radiant energy of the sun, said footing wall serving as the inner wall of said moat and being formed of heat conducting material, a heat transfer medium arranged within the lower part of said moat, and means for heating said medium whereby heat is transferred through said medium and through said footing wall to the walls of said building.

4. An arrangement for reducing the loss of heat from a building having a substantial portion of its structure arranged below the surface of the ground, and having its lowermost floor resting directly in contact with the soil, said arrangement comprising a moat formed immediately adjacent said building and surrounding a substantial portion of the periphery of said building, the inner walls of said moat being formed of the outer walls of said building, said moat extending downwardly to expose a substantial portion of the underground walls of said building to atmosphere within the moat, a cover closing the top of said moat to thermally insulate the air in said moat from the external atmosphere, a source of heat, and heat transferring means connected to said source of heat and arranged externally of the walls of said building and in a position to transfer heat to said floor.

5. An arrangement according to claim 4 wherein said cover is supported in an inclined position against the outer wall of said building and covers a portion of said outer wall located above the ground level, said cover being formed of a material to transmit radiant energy of the sun.

6. An arrangement according to claim 4 wherein said heat transferring means comprises a body of liquid contained in the bottom of said moat below the level of the lowermost floor of said building.

7. An arrangement according to claim 4 wherein said heat transferring means comprises a series of heating pipes embedded in the ground which supports the lowermost floor of said building.

RUTCHER SKAGERBERG.

REFERENCES CITED

The following references are of record in the file of this patent:

UNITED STATES PATENTS

| Number | Name | Date |
|---|---|---|
| 1,130,870 | Willsie | Mar. 9, 1915 |
| 1,350,968 | Guerin | Aug. 24, 1920 |
| 1,858,330 | Horning | May 17, 1932 |
| 2,030,350 | Bremsek | Feb. 11, 1936 |
| 2,342,211 | Newton | Feb. 22, 1944 |

OTHER REFERENCES

"The Solar House," (2), pages 55 through 59, Heating and Ventilating, March 1947.

"Harnessing the Sun," pages 284–286, Scientific American, June 1942.

"Sun Furnace in Your Attic," pages 106–112, Popular Science, March 1949.

"The Solar House," pages 90–94, Progressive Architecture, May 1947.